(12) United States Patent
Salazar et al.

(10) Patent No.: US 7,987,570 B2
(45) Date of Patent: Aug. 2, 2011

(54) ADJUSTABLE APPARATUS FOR REMOVING WIRES FROM UNDERGROUND CONDUIT

(76) Inventors: Abel Alex Salazar, Los Angeles, CA (US); Stanley L. Stosel, San Pedro, CA (US)

(*) Notice: Subject to any disclaimer, the term of this patent is extended or adjusted under 35 U.S.C. 154(b) by 121 days.

(21) Appl. No.: 12/494,178

(22) Filed: Jun. 29, 2009

(65) Prior Publication Data

US 2009/0320257 A1    Dec. 31, 2009

Related U.S. Application Data

(60) Provisional application No. 61/133,560, filed on Jun. 30, 2008.

(51) Int. Cl.
*B23P 19/04*    (2006.01)
(52) U.S. Cl. .......... 29/244; 29/270; 254/134.3 FT; 254/134.3 R
(58) Field of Classification Search ......... 254/134.3 FT, 254/134.4 R; 29/244, 155, 270
See application file for complete search history.

(56) References Cited

U.S. PATENT DOCUMENTS

| | | |
|---|---|---|
| 2,804,979 A | 9/1957 | Lassiter |
| 2,985,430 A | 5/1961 | Greenwood |
| 3,072,383 A | 1/1963 | Vanderhagen |
| 3,223,384 A | 12/1965 | Gebo |
| 3,226,088 A | 12/1965 | Habighorst |
| 3,578,290 A | 5/1971 | Gof |
| 3,968,952 A | 7/1976 | Newell |
| 4,270,734 A | 6/1981 | Straight |
| 4,497,470 A * | 2/1985 | Carter et al. ......... 254/134.3 FT |
| 4,771,988 A | 9/1988 | Scroggins, Sr. |
| 4,801,127 A * | 1/1989 | Patterson, Jr. ........ 254/134.3 FT |
| 4,899,988 A | 2/1990 | Mills |
| 5,464,193 A | 11/1995 | Wrate |
| 5,509,638 A | 4/1996 | Leon-Vieito |
| 5,697,597 A * | 12/1997 | Goodbold ..................... 254/4 B |
| 5,918,861 A | 7/1999 | Parker |
| 6,086,050 A | 7/2000 | Wiederkehr et al. |
| 6,431,524 B1 * | 8/2002 | Weber ................. 254/134.3 FT |
| 6,883,783 B1 | 4/2005 | Quittschreiber |
| 7,832,709 B2 * | 11/2010 | O'Connor ............. 254/134.3 R |
| 2007/0221896 A1* | 9/2007 | Jordan et al. ......... 254/134.3 FT |
| 2009/0320257 A1* | 12/2009 | Salazar et al. .................. 29/244 |

* cited by examiner

*Primary Examiner* — Lee D Wilson
(74) *Attorney, Agent, or Firm* — Cislo & Thomas, LLP

(57) ABSTRACT

An apparatus for removing wires and cables through underground conduits that overcomes the disadvantages of previous wire pulling devices and is simple in design, easy to use, and easy to transport. Such an apparatus comprises a base frame, an upper pulley, a lower pulley, and an adjustable frame to adjust the height of the pulleys relative to the ground. In addition, the lower pulley can also function as a wheel for transporting the apparatus.

18 Claims, 10 Drawing Sheets

ADJUSTABLE APPARATUS FOR REMOVING WIRES FROM UNDERGROUND CONDUIT

CROSS-REFERENCE

This patent application claims the benefit of U.S. Provisional Patent Application Ser. No. 61/133,560, entitled "Adjustable Apparatus for Removing Wires From Underground Conduit," filed Jun. 30, 2008, which application is incorporated in its entirety here by this reference.

BACKGROUND OF THE INVENTION

1. Technical Field

This invention relates to an apparatus for pulling underground cables, wire, lines, and the like.

2. Background Art

Pulling underground wire and cables has posed a number of challenges for devices designed to effectuate such goals. Proper consideration is given to designs that provide suitable leverage and self-contained or automatic pulling means. These devices, however, tend to be large, heavy and/or cumbersome making it difficult to set up at one location, accomplish the task, and quickly move to a second location to begin the next task.

Thus, there is a need for a wire or cable pulling apparatus that is simple in design, easy to use, and easy to transport to make pulling underground wires and cables through conduits an efficient process.

BRIEF SUMMARY OF INVENTION

The present invention is directed to an apparatus for removing wires and cables through underground conduits that overcomes the disadvantages of previous wire pulling devices and is simple in design, easy to use, and easy to transport. Such an apparatus comprises a base frame, a means for securing and adjusting the height of the base frame, an upper pulley, and a lower pulley, wherein the lower pulley can function as a means for transporting the apparatus.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
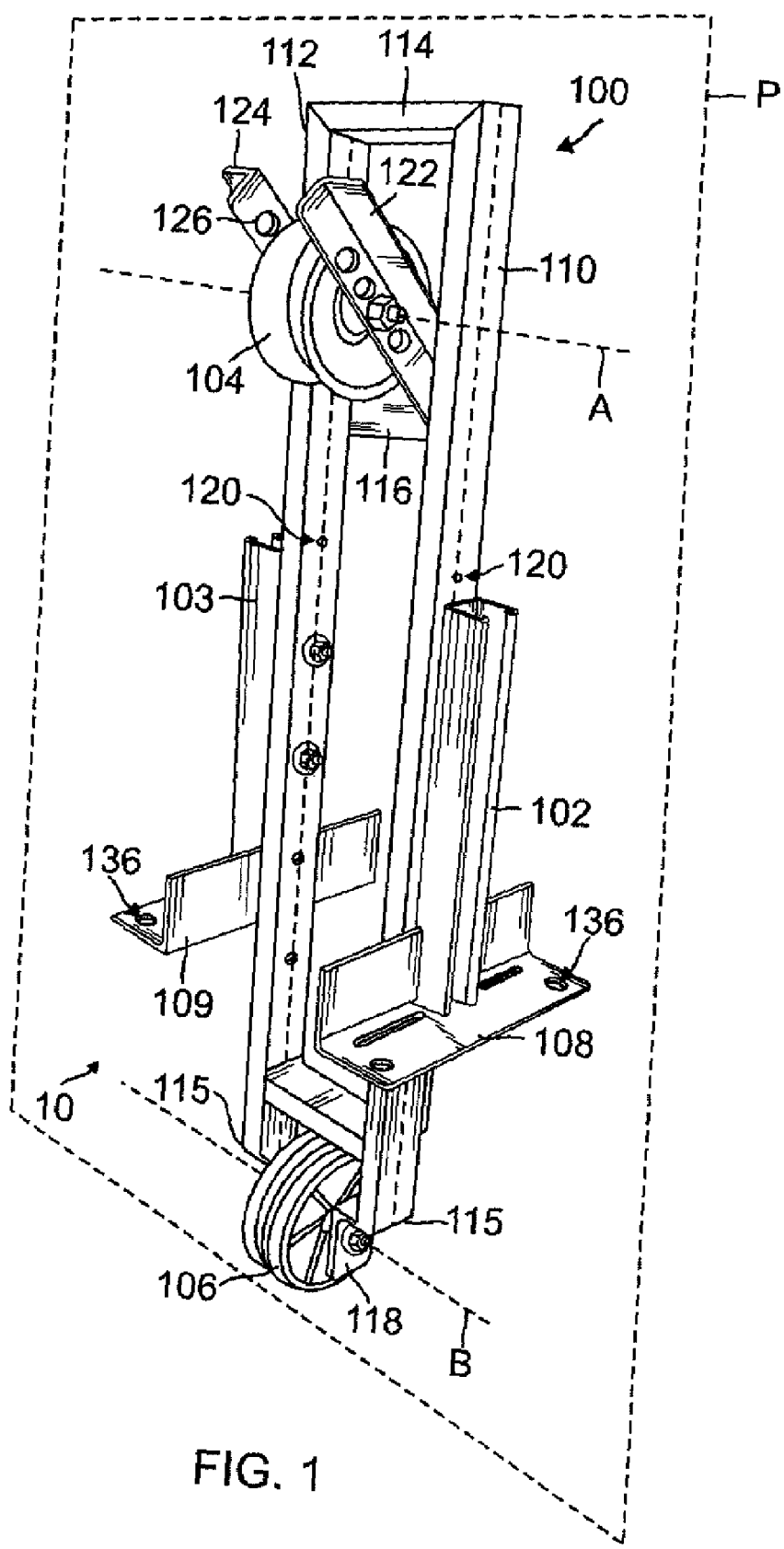
FIG. 1 is a perspective view of an embodiment of the current invention.
Figure 2:
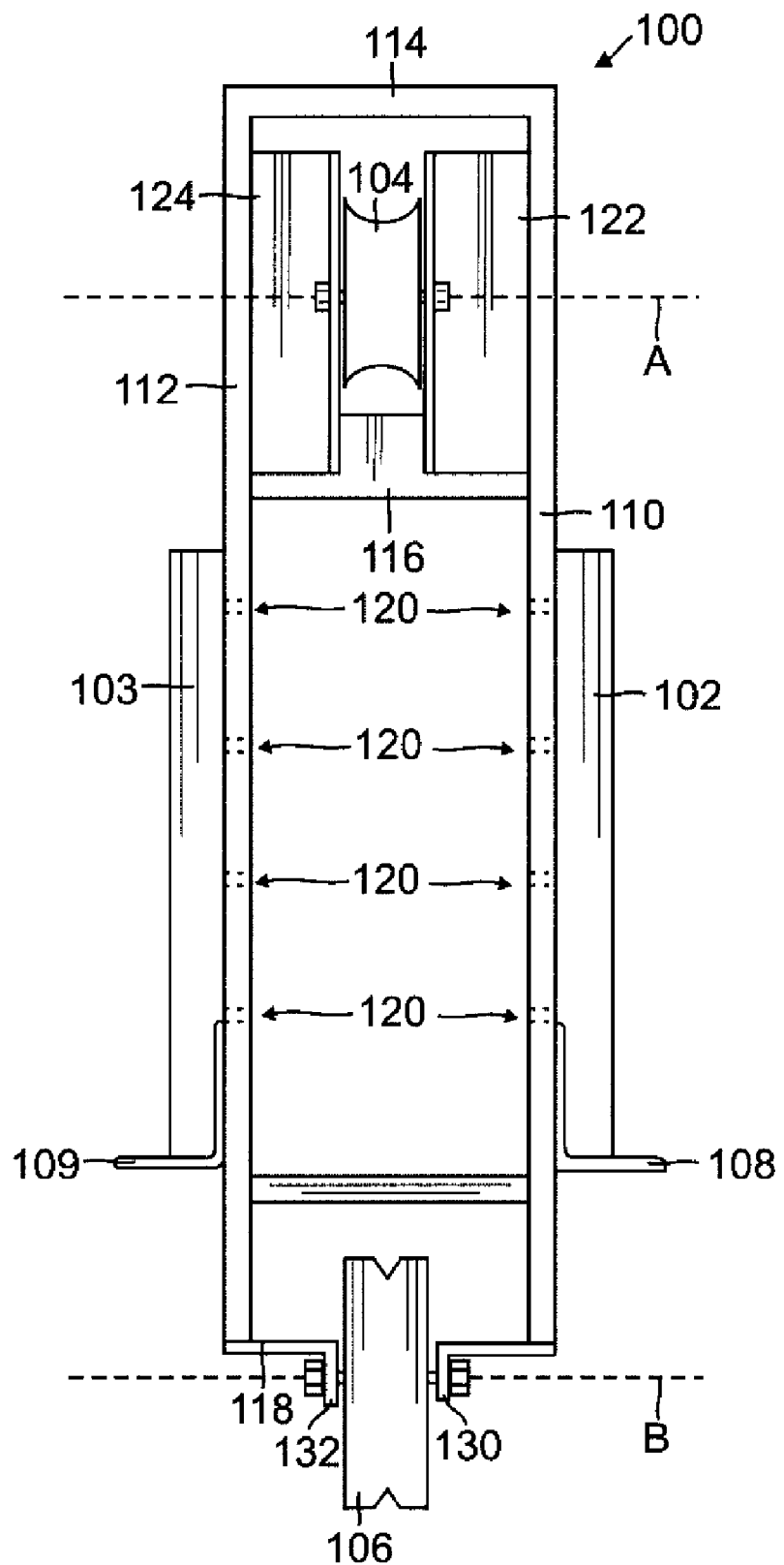
FIG. 2 is a front elevation view of the embodiment shown in FIG. 1.
Figure 8:
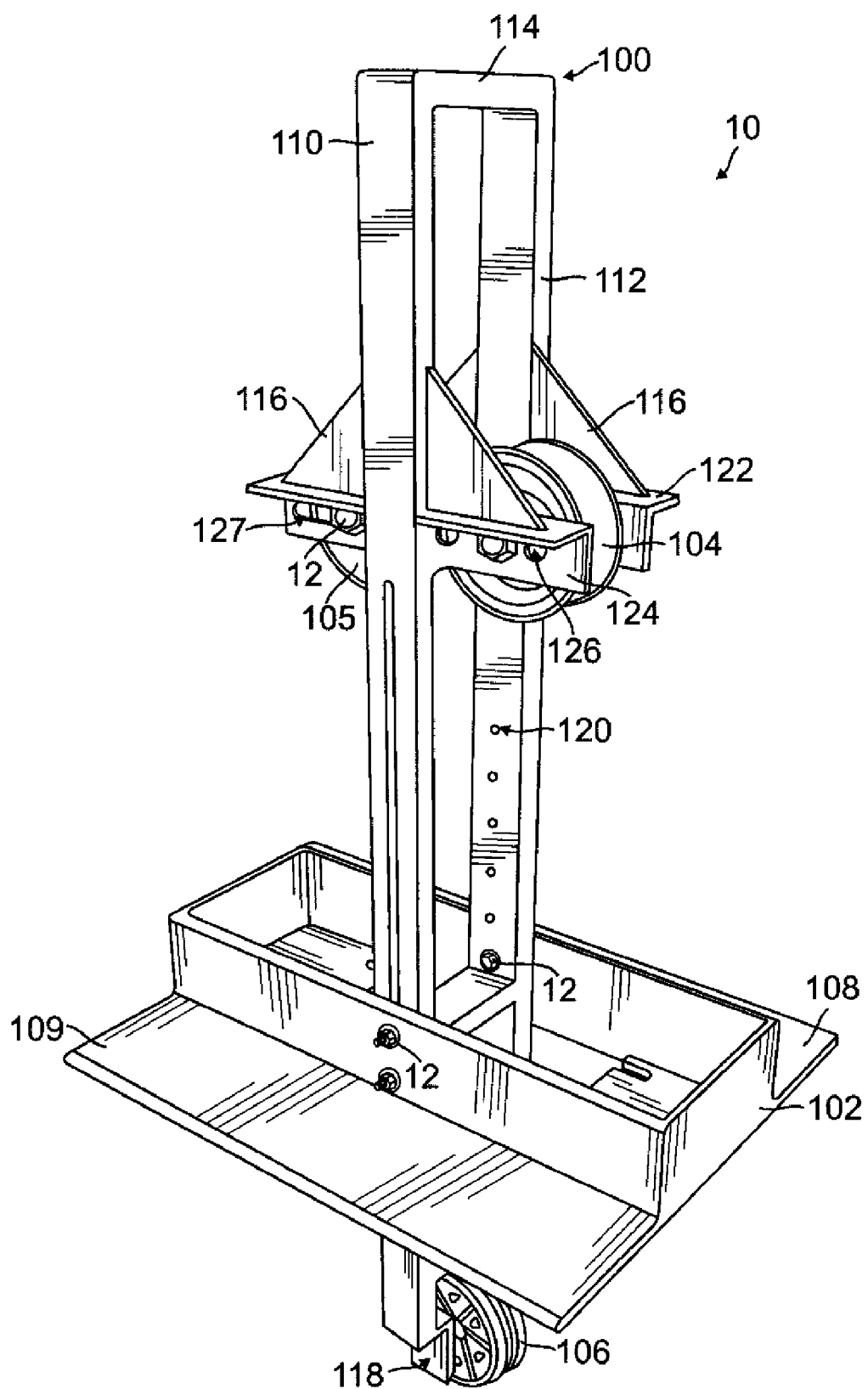
FIG. 8 is a perspective view of another embodiment of the present invention.
Figure 9:
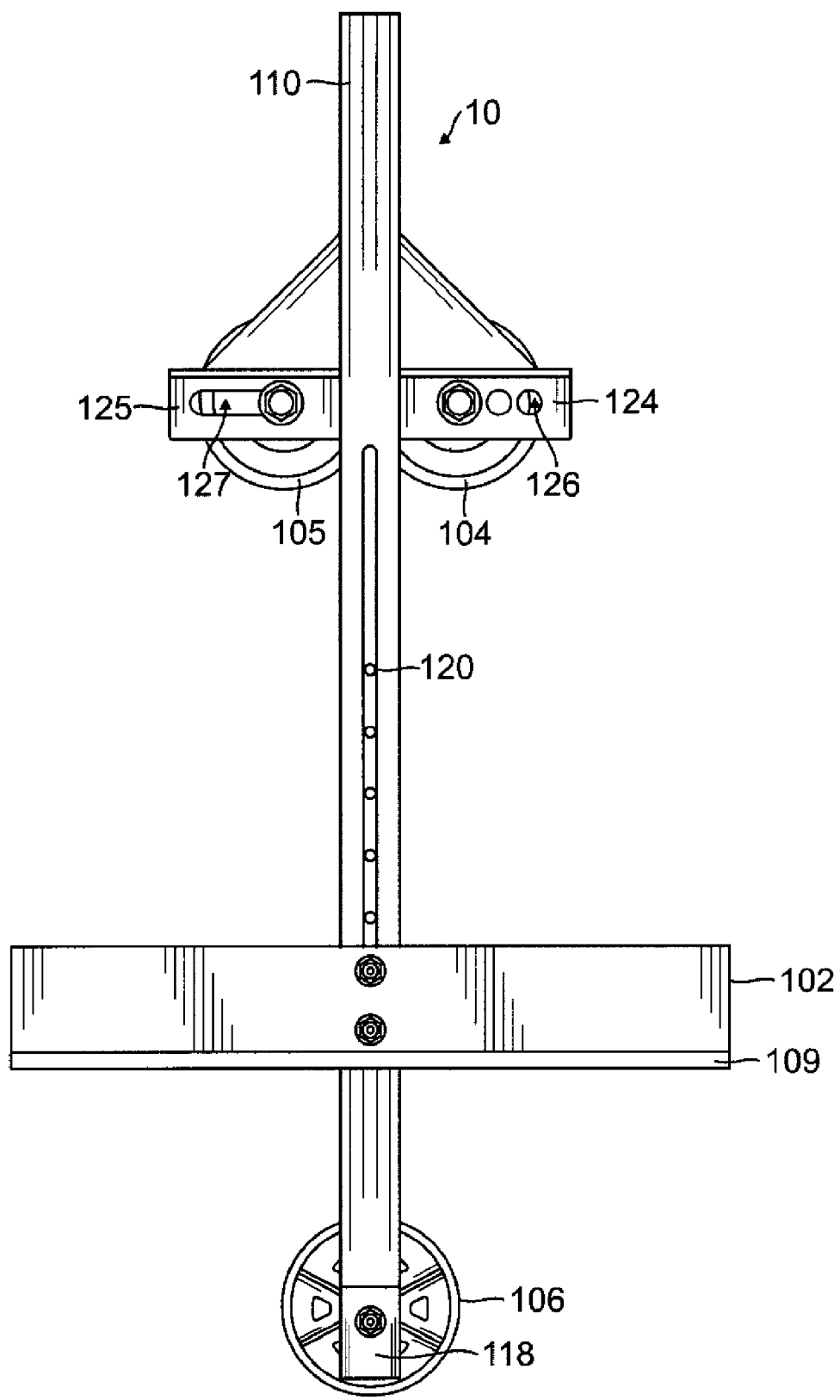
FIG. 9 is a side elevation view of the embodiment shown in FIG. 8.
Figure 10:
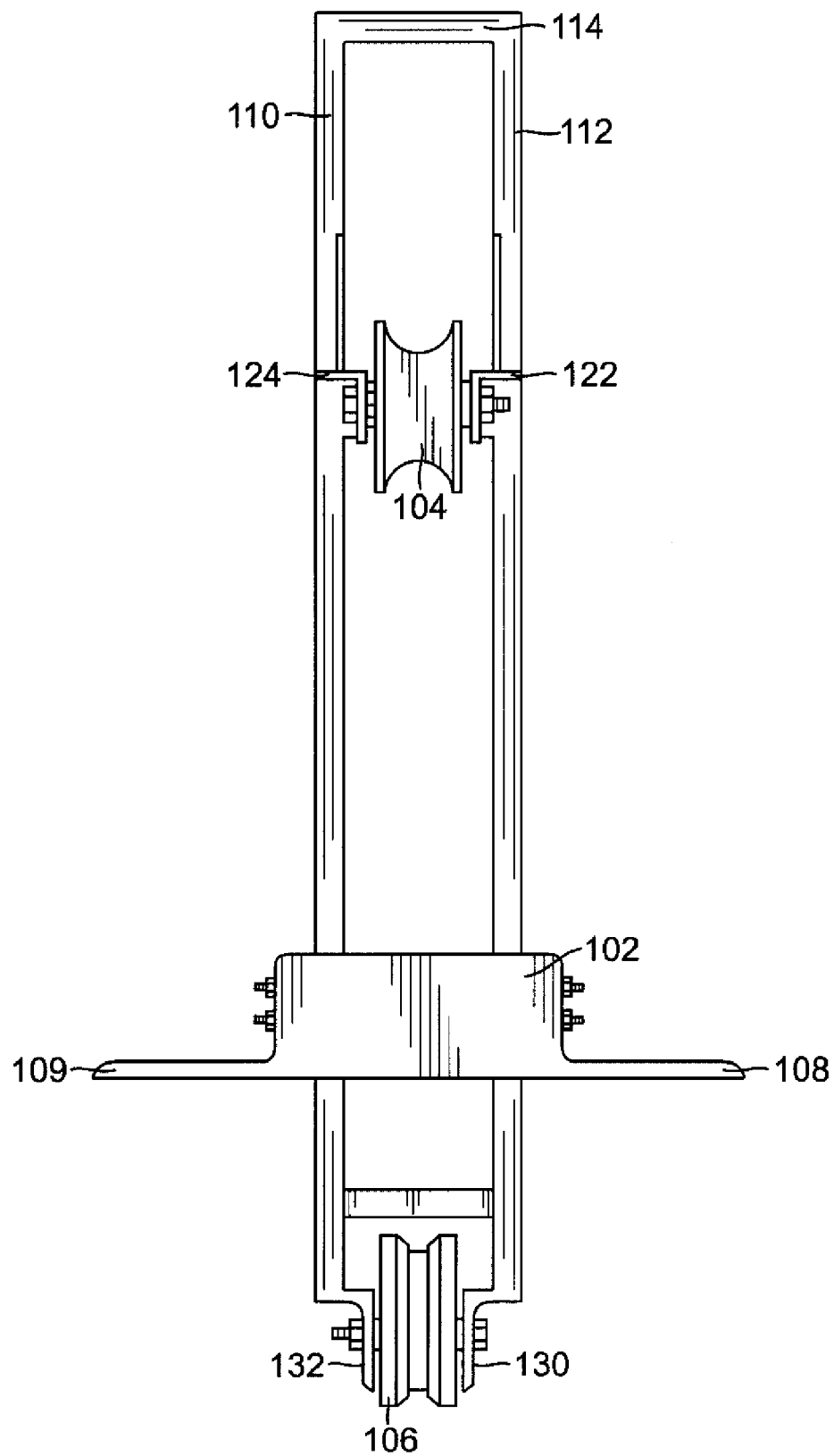
FIG. 10 is a front elevation view of the embodiment shown in FIG. 8.

The present invention is directed towards an apparatus 10 for pulling underground wires, the apparatus comprising a base frame 100, an adjustable frame 102, an upper pulley 104, and a lower pulley 106 as shown in FIG. 1. In some embodiments, the apparatus 10 may comprise two adjustable frames 102, 103, as shown in FIG. 1. In some embodiments, the apparatus 10 may comprise two upper pulleys 104, 105 as shown in FIG. 8. Due to the efficient, substantially vertical configuration of the apparatus 10, the apparatus 10 requires minimal parts, is relatively light, and easily transportable.

The base frame 100 provides the structural support for the upper and lower pulleys 104-106 and bears the load when wires are pulled through the upper and lower pulleys 104-106. In the preferred embodiment, the base frame 100 is shaped like a rectangular frame with two elongated, vertical support members 110, 112 and at least one crossbar 114. Each vertical support member 110, 112 may comprise a plurality of holes 120 vertically and intermittently spaced apart to receive a fastening member 12. The holes 120 are designed to align with reciprocal adjustment holes 133 or slots 134 on the adjustable frame 102 to provide a means for adjusting the height of the adjustable frames 102, 103 or the upper pulley 104 and/or 105.

The crossbar 114 is a sturdy bar joining the first vertical support member 110 with the second vertical support member 112 to provide lateral stability to the base frame 100. The crossbar 114 may be strategically placed anywhere along the vertical support members 110, 112 so long as it does not interfere with the pulling function of the apparatus. In addition, multiple crossbars may be utilized to increase the stability. The crossbar 114 may be fastened to the vertical support members 110, 112 by any means that provides a secure connection, such as welding or screwing with nuts and bolts.

The upper pulley 104 may be operatively connected to the upper portion of the base frame 100 by an upper pulley mount comprising a pair of mounting bars 122, 124. In some embodiments, a single mounting bar 122 may be sufficient. The upper pulley 104 is rotatably mounted to the mounting bars 122, 124. In some embodiments, the mounting bars 122, 124 may protrude out past a central plane P defined by the base frame 100 as shown in FIG. 1 or may project within the central plane P. This allows the axis of rotation A of the upper pulley 104 to be positioned in front of, behind, or in the middle of the base frame 100 to adjust the leverage applied to the upper pulley 104.

In some embodiments, the upper pulley 104 may be mounted directly on the vertical support members 110, 112. The size of the upper pulley 104 may be adjusted so as to provide the proper leverage and angle of pull relative to the lower pulley 106.

The mounting bars 122, 124 may comprise a plurality of holes 126 or a slot 127 along its longitudinal dimension to provide a means for adjusting the position of the mounting bars 122, 124 and/or the upper pulley 104 and/or 105 relative to the base frame 100. For example, the mounting bars 122, 124 and/or the upper pulley 104 and/or 105 may be positioned at various heights and/or various distances in front of or behind the base frame 100. Thus, to change the positioning of the upper pulley 104, a user need only loosen or unfasten the upper pulley 104 from the mounting bars 122, 124 at a first mounting hole 126 and align the center of the upper pulley 104 with a second mounting hole 126 and fasten the upper pulley 104 into the second mounting hole. Other means for adjusting the mounting bars 122, 124 and/or upper pulley 104 and/or 105 have been contemplated by the inventors. For example, rather than mounting holes 126, the first pair of mounting bars may comprise mounting slots 127. Rather than removing a bolt 12 from a first hole 126 and inserting it into a second hole 126, a user need only loosen a bolt 12 inside a slot 127 and slide the upper pulley 104 to a new location and fasten the bolt 12 to secure the upper pulley 104 in its new position.

In some embodiments, the slot 127 may be toothed and the upper pulley 104 may be operatively connected to the toothed slot with a gear to provide a means for adjusting the pulley 104 and/or 105 relative to the base frame 100 without the use of additional tools. A dial may be attached to the gear to provide leverage in rotating the gear to move the upper pulley 104 along the slot 127. A lock can be implemented to secure the upper pulley 104 at a desired position.

The mounting bars 122, 124 may also be adjustably attached to the vertical support members 110, 112. Thus, the height of the mounting bars 122, 124 may be adjusted depending on which vertical support member hole 120 the first pair of mounting bars 110, 112 are attached to. Alternatively, the mounting bars 122, 124 may be fixedly attached to the vertical support members 110, 112 by, for example, welding.

In some embodiments, the mounting bars 122, 124 may be rotatably coupled to the vertical support members 110, 112 so as to adjust the angle created between the mounting bars 122, 124 and the vertical support members 110, 112. The mounting bars 122, 124 may be rotatable through a 360° angle. Therefore, the apparatus 10 may be reversible simply by rotating the mounting bars 122, 124 clockwise or counterclockwise to the opposite side of the vertical support bars 110, 112.

In some embodiments, the apparatus 10 may be made reversible by utilizing two upper pulleys 104, 105 on opposite sides of the base frame 100, as shown in FIG. 8. The mounting means described for the first upper pulley 104 can be utilized in the second upper pulley 105 in any combination thereof.

A second pulley mount 118 may be attached to the lower half of the vertical support bars 110, 112. In some embodiments, the second pulley mount 118 is located at the very bottom end or the bottom edge 115 of the vertical support bars 110, 112 as shown in FIGS. 1 and 8. The second pulley mount 118 comprises a second pair of mounting bars 130, 132. The second pair of mounting bars 130, 132 project downwardly from the vertical support members 110, 112 such that when the lower pulley 106 is mounted on the second pair of mounting bars 130, 132, the axis of rotation B of the lower pulley 106 may be within the plane P of the base frame 100 or offset from the plane P of the base frame 100. The lower pulley 106 is rotatably mounted on the second pair of mounting bars 130, 132.

The lower pulley 106 has a diameter sufficiently large so as to protrude below the second pair of mounting bars 130, 132 as shown in FIGS. 2-3 and 9-10. Therefore, the lower pulley 106 can function as a wheel on which the apparatus 10 can roll to mobilize the apparatus 10. Due to the simple design and unique lower pulley 106 placement, a single user is able to move the apparatus 10 to a first location, perform the pulling function, remove the apparatus 10 from the first location, and move the apparatus 10 to a second location quickly and efficiently with minimal assistance from other people or other vehicles.

Figure 3:
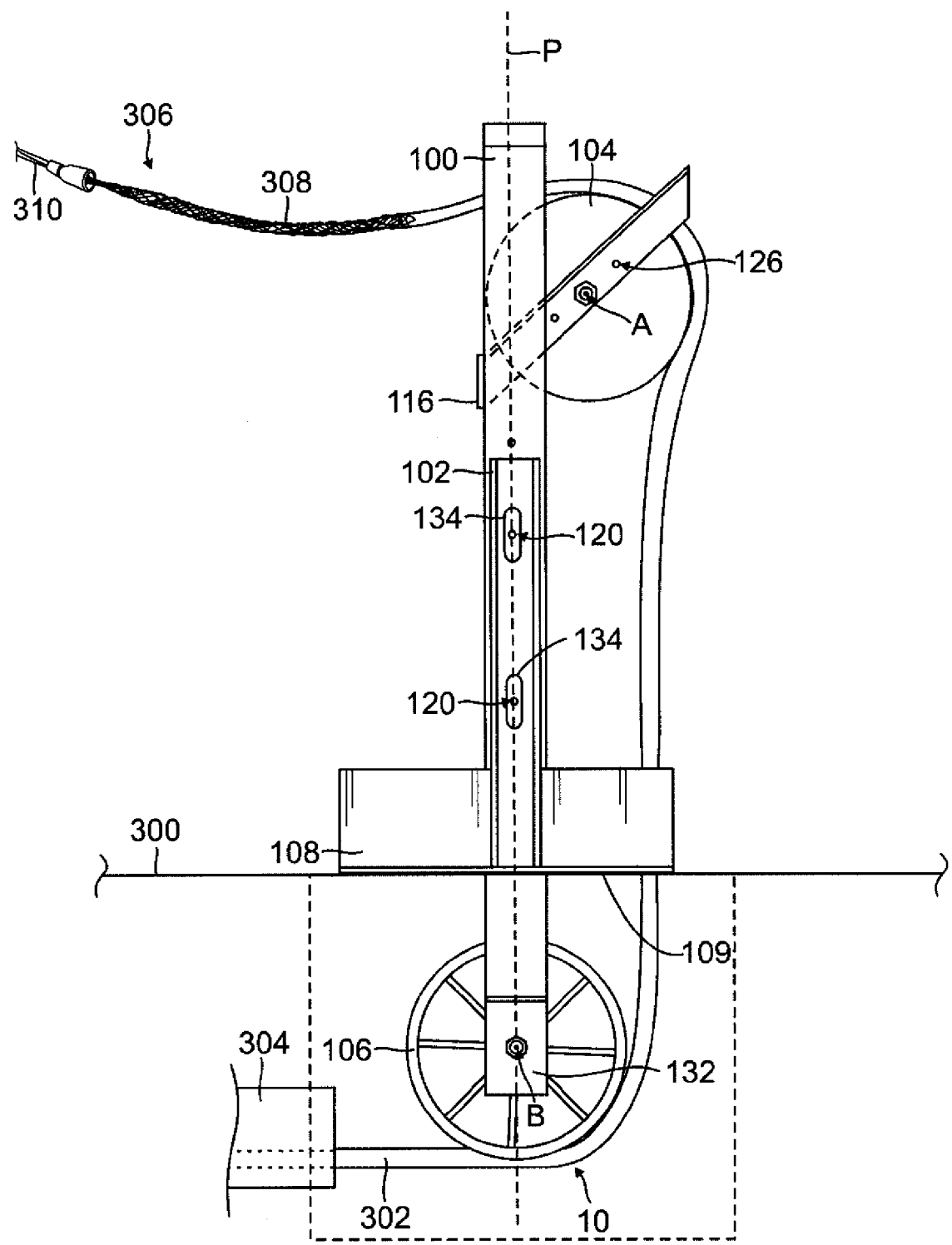
FIG. 3 is a side elevation view of the embodiment shown in FIG. 1 positioned in a can.
Figure 11:
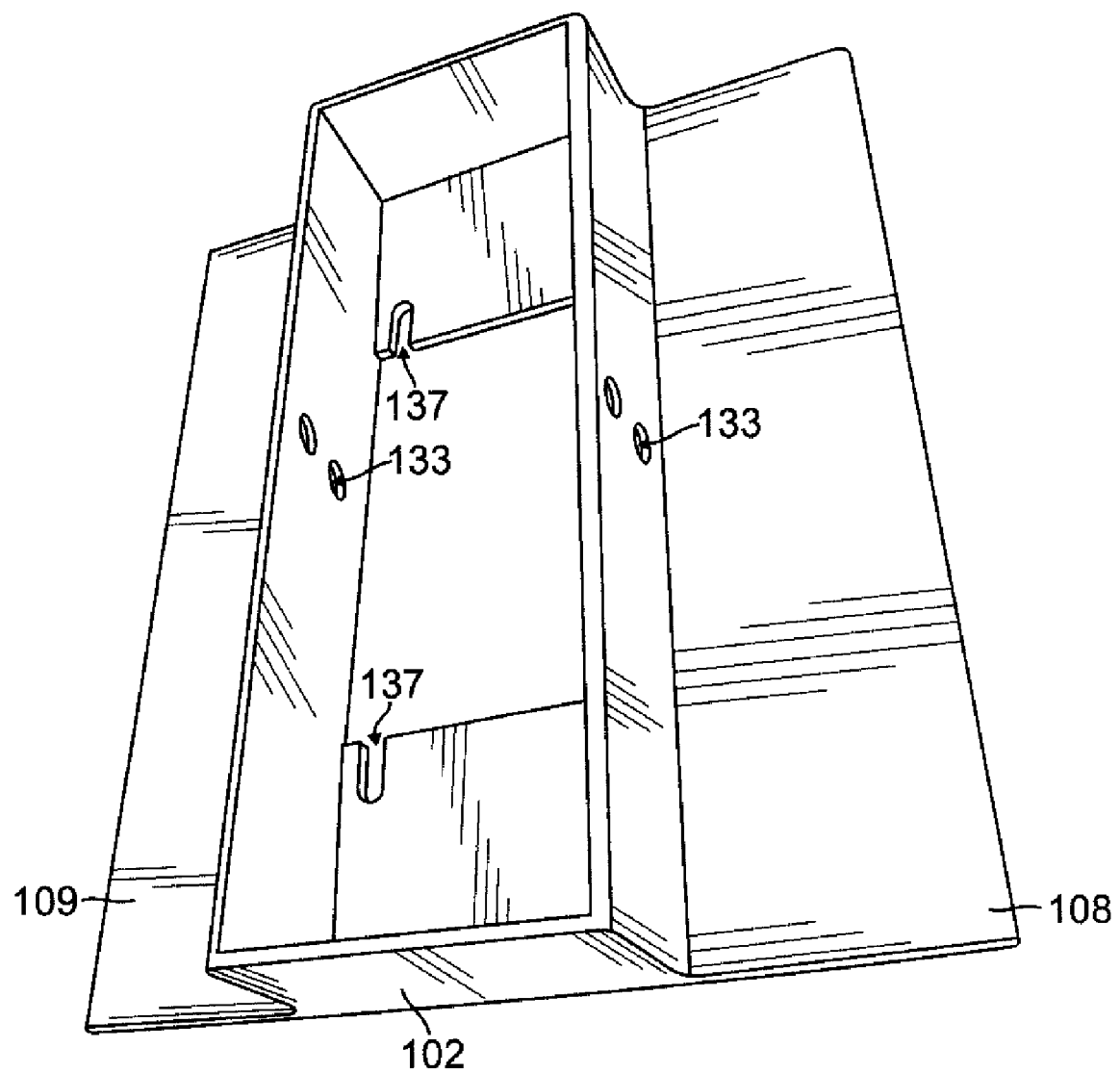
FIG. 11 is a perspective view of an embodiment of the adjustable frame.

Each vertical support member 110, 112 has adjustable frames 102, 103, respectively, attached to it. In some embodiments, the adjustable frame 102 maybe a single integral piece as shown in FIGS. 8 and 11. The adjustable frame 102 and/or 103 provides support for the apparatus 10 when the apparatus 10 is placed into a hole in the ground, for example, in a can 400 on an airport runway. The adjustable frames 102, 103 comprise a means for adjusting the height of the lower pulley 106 inside the can 400. For example, as shown in FIGS. 3 and 11, the adjustable frame 102 and/or 103 may comprise adjustment holes 133 or slots 134 through which a fastening member 12, such as a bolt, can be inserted to fasten the adjustable frame 102 and/or 103 to the base frame 100. The adjustment hole 133 or slot 134 may be aligned with any vertical member support hole 120 to adjust the height of adjustable frame 102 and/or 103.

The adjustable frame 102 and/or 103 may be securely connected to a support plate 108 and/or 109. In embodiments comprising two separate adjustable frames 102, 103, each adjustable frame would have a separate support plate 108, 109. In some embodiments, the adjustable frame 102 and/or 103 may be welded to the support plates 108, 109. In some embodiments, the adjustable frame 102 and/or 103 may be a single integral piece. Therefore, adjusting the adjustable frames 102, 103 also results in the adjustment of the support plates 108, 109.

The support plates 108, 109 are used to improve the stability of the apparatus 10 by increasing the surface area of the adjustable frame 102 that rests on a surface 300. Thus, the height of the pulleys 104 and/or 106 may be determined by the position of the support plates 108, 109. This allows the user to place the lower pulley 106 at the proper depth so that the wires 302, cables, lines, etc. can be pulled parallel to the length of the conduit 304 so as to reduce or avoid any friction between the conduit 304 and the wires 302, cables, lines, etc., as shown in FIG. 3.

The support plates 108, 109 may also comprise support plate holes 136 or slots 137, so that the support plates 108, 109 can be secured to the surface 300 to stabilize and secure the apparatus 10 relative to the surface 300. This allows the apparatus 10 to be moved into place and secured to a surface 300 and the height of the pulleys 104, 106 adjusted relative to the surface 300.

Figure 5:
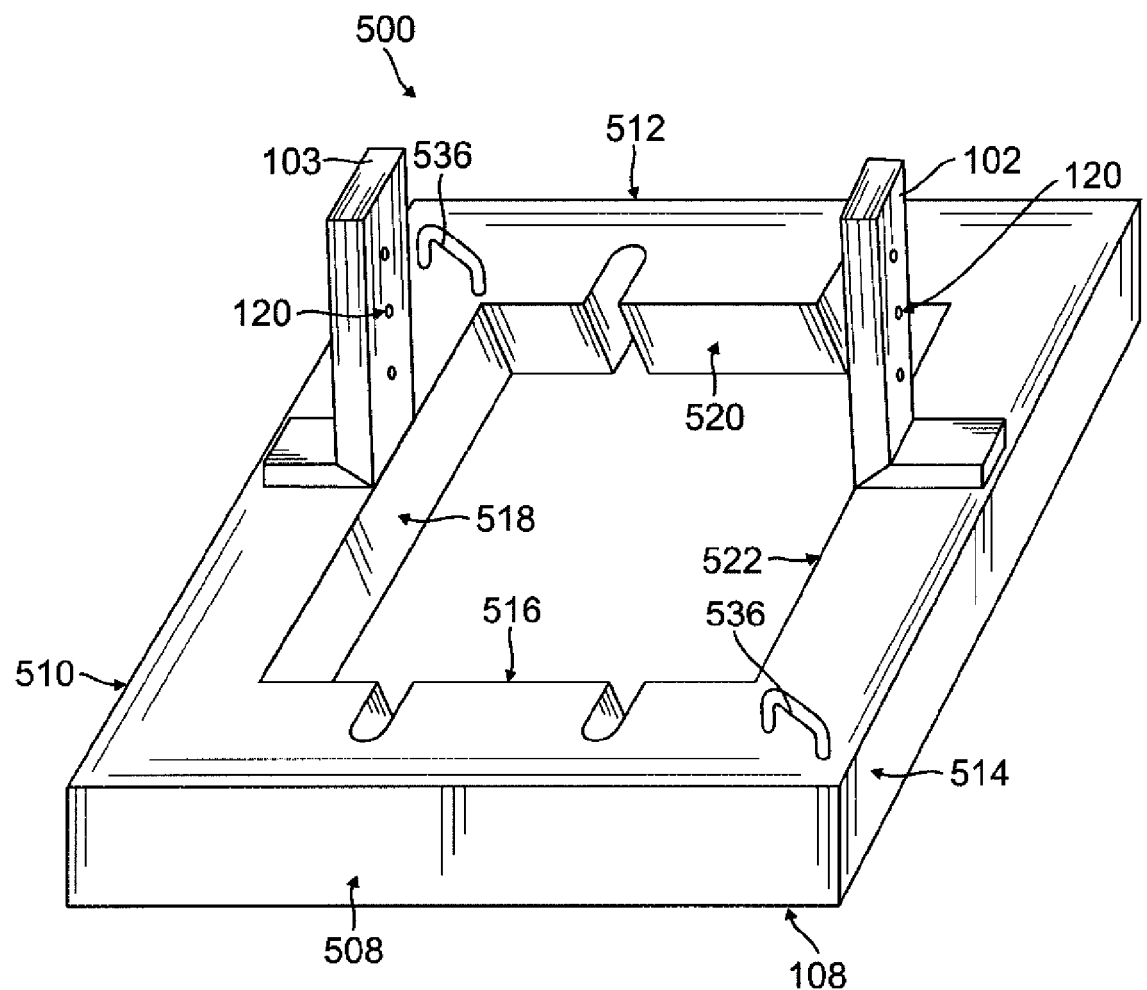
FIG. 5 is a perspective view of an embodiment of an adjustable frame.
Figure 6:
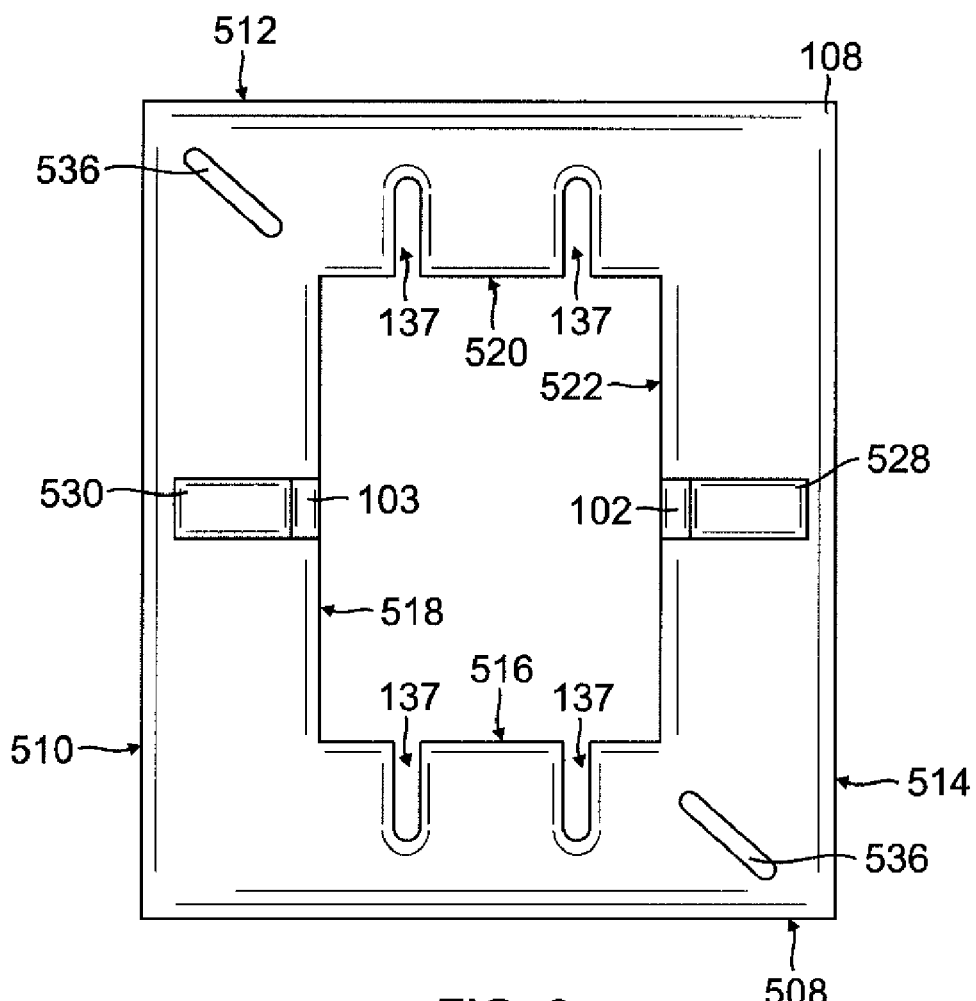
FIG. 6 is a top view of the adjustable frame in FIG. 5.
Figure 7:
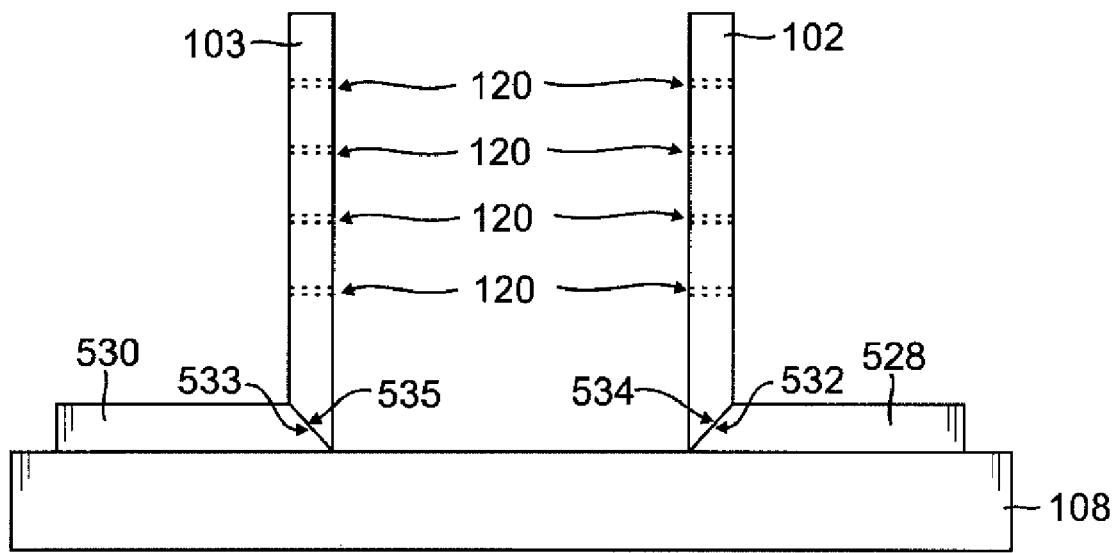
FIG. 7 is a side elevation view of the adjustable frame in FIG. 5.

In some embodiments, as shown in FIG. 5, the support plate 108 may be a single integral piece. The support plate 108 may be generally a square or rectangular shape having four outer perimeter walls 508, 510, 512, 514 and four inner perimeter walls 516, 518, 520, 522, wherein the four inner perimeter walls 516, 518, 520, 522 define an opening. A first inner perimeter wall 516 and a third inner perimeter wall 520 opposite the first inner perimeter wall 516 may each comprise the slot 137 extending through the entire vertical thickness of the inner perimeter wall. These slots 137 provide throughholes into which a bolt may be inserted to secure the support plate 108 to the can 400. The holes 136 and slots 137 provide a means for adjusting the support plate 108 and/or 109 to accommodate cans 400 of different sizes. Extending upwards from the second and fourth inner perimeter walls 518, 522 may be the adjustable frames 102, 103. The adjustable frames 102, 103 comprise a plurality of support 120 so as to connect to the vertical support member 110, 112. To provide stability to the adjustable frame 102, 103 each adjustable frame 102, 103 may be buttressed by a horizontal bar 528, 530, respectively, with a 45' angled face 532, 533 welded to a reciprocal 45° angled face 534, 535 respectively, of the adjustable frames 102, 103.

The support plate 108 may further comprise handles 536 for ease of carrying.

In some embodiments, the apparatus 10 may comprise means for automatically adjusting the height of the lower pulley 106 without the requirement of additional tools. For example, the adjustable frame 102 and/or 103 may be attached to the base frame 100 by a gear mechanism. For example, the adjustable frame 102 and/or 103 may comprise a toothed slot 134 operatively connected to a toothed gear on the base frame 100. Rotation of the toothed gear would result in the adjustable frame 102 and/or 103 moving up or down. A dial or handle can be attached to the gear to provide leverage to rotate the gear. A lock can be used to secure the adjustable frame 102 at the desired location.

Numerous other means for manually and automatically adjusting the pulleys 104, 105, and/or 106, the pulley mounts 122 and/or 124, and the adjustable frame 102 and/or 103 have been contemplated, such as using pneumatic pumps, hydraulic pumps, gears, ratchet and pawls, slides, bearings, wheels, hinges, and the like.

The wire puller utilizes a Chinese-handcuff type attachment 306 to attach to the wires. The attachment 306 comprises metallic threads or wires 308 interwoven generally into a cylindrical shape having an orifice through the center. The threads 308 may be made out of other sturdy, pliable material that provides friction or grip against the wire, such as rope, leather, wood, and the like. Compressing the attachment 306 expands the diameter of the orifice and pulling the attachment contracts the orifice. In the compressed configuration, cut wires, cables, or lines can be inserted into the attachment 306. When the attachment 306 is pulled, the wires, cables, or lines are compressed by the attachment. Frictional forces keep the wires, cables, or lines compressed inside the attachment 306 as the attachment 306 is pulled. The attachment 306 may be any other type of attachment typically used to pull wires in this application.

The attachment 306 may be connected to a rope, cable, chain, or any other device 310 that can be pulled across the pulleys 104, 106. The rope, cable, chain or the like can be attached to a vehicle or winch to provide the pulling force to pull the wires, cables, or lines out.

In one embodiment, the apparatus 10 measured less than fifty inches in total height, less than ten inches in total width, and less than 12 inches in total depth. The apparatus 10, however, can be constructed in any dimension to fit any size can or hole in which wires are located.

In certain uses, such as on airport runways, additional accessories may be required. On airport runways, electrical wires are accessible through holes in the ground referred to as cans 400. These cans 400 are cylindrical in shape with the top portion comprising a ledge 402. The ledge 402 may further comprise a threaded hole 404 through which bolts or screws may be secured. As such, to provide stability circular washers 406 or gaskets may be inserted on to the ledge 402 until the washers 406 are flush with the runway surface 300. The washers 406 may further comprise through-holes 408 to line up with the threaded holes 404 on the ledge 402 of the can 400. A first stabilizing bar 410 may be laid across the runway surface 300 and the washers 406. The stabilizing bar 410 also comprises holes or slots 430 that line up with the through-holes 408 of the washer 406 and the threaded hole 404 of the can. A bolt may be inserted into the hole 430 of the stabilizing bar 410 through the through-holes 408 of the washers 406 and secured into the threaded hole 404 of the can 400. A second stabilizing bar 412 may be similarly secured opposite and parallel to the first stabilizing bar 410. Once the stabilizing bars 410, 412 are secured to the can, the apparatus 10 may be secured to the stabilizing bars 410, 412 through the support plates 108, 109 by securing a fastening member 12 through the support plate holes 136, through-holes 408 of the washer 406, and into the threaded hole 404 of the can 400.

Figure 4A:
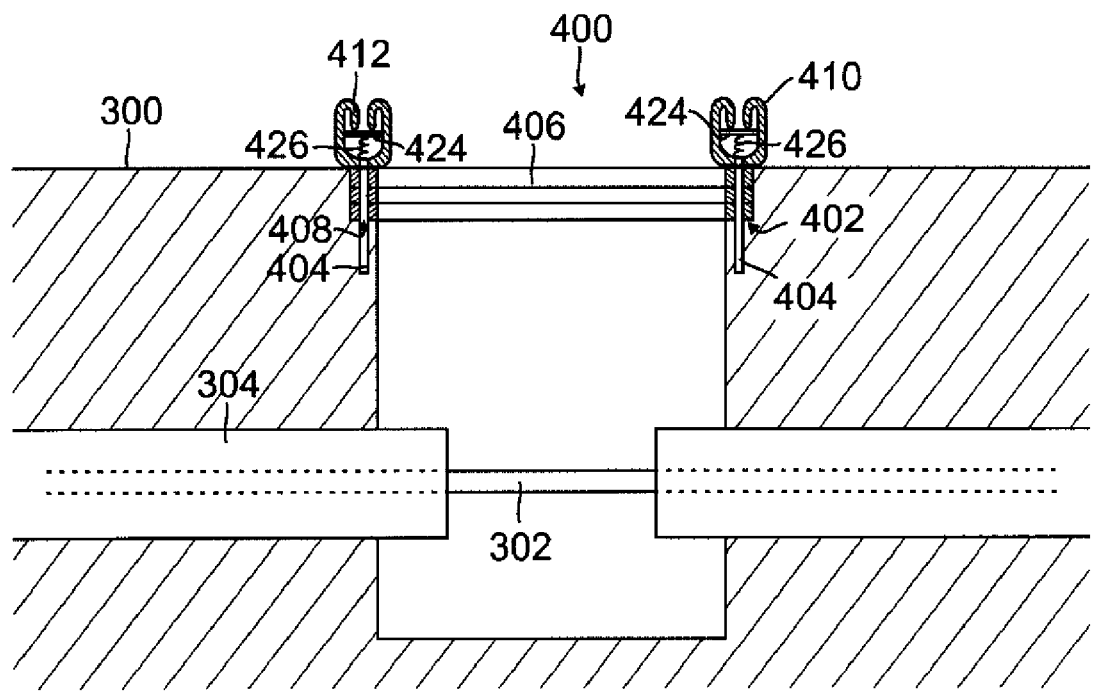
FIG. 4A is a cross section of a can with the stabilizing bars in place.
Figure 4B:
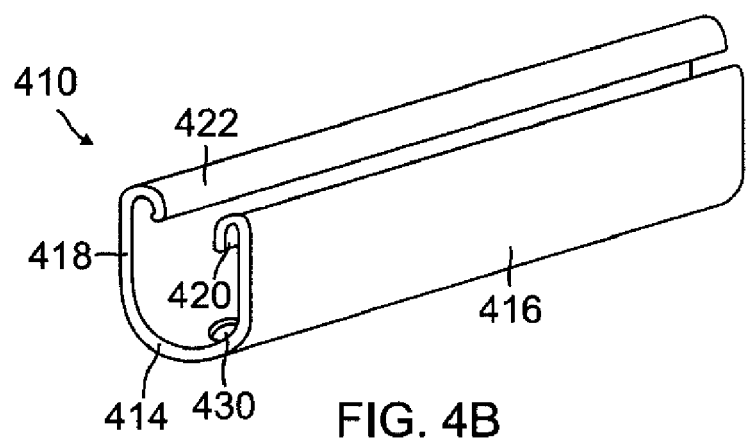
FIG. 4B is a perspective view of the stabilizing bar.

The stabilizing bars 410, 412 may comprise a unique design to keep the bar sturdy yet light. The stabilizing bars 410, 412 are generally "U", shaped having a base 414 and two sides 416, 418. The base comprises the holes or slots 430 through which a bolt can be inserted to secure the stabilizing bar 410, 412 to the can 400. The two sides are bent inward back onto themselves thereby creating a lip 420, 422. A spring-loaded nut 424 is configured to fit in between the sides 416, 418 of the "U" shaped stabilizing bar, however, when arranged horizontally, the spring-loaded nut catches the lips 420, 422 of the stabilizing bar as shown in FIG. 4A. The spring 426 is placed against the base 414 of the stabilizing bar 410 or 412 such that the spring 426 forces the nut 424 into the lips 420, 422 of the stabilizing bar 410 or 412. The support plate 108 or 109 may be placed on the stabilizing bars 410 or 412 with the support plate holes 136 aligned with the spring-loaded nut 424. The support plates 108, 109 can then be tightly secured to the stabilizing bar 410 or 412.

Thus, the apparatus 10 is constructed with a minimum number of parts making the construction inexpensive. The substantially vertical design without the need of unnecessary horizontal booms or horizontal stabilizing devices makes the apparatus easy to handle and easily transportable.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. An adjustable wire puller for removing wires from an underground conduit, comprising:
   a. a base frame having a vertical support member having a top end and a bottom end, the base frame defining a central plane;
   b. an upper pulley mount attached to the base frame, wherein the upper pulley mount is attached at an angle to the base frame, the upper pulley mount having a plurality of apertures;
   c. a first upper pulley rotatably attached to the upper pulley mount, wherein the first upper pulley is rotatable about a first horizontal axis, wherein the first horizontal axis is outside the central plane, and wherein the first upper pulley is adjustable relative to the base frame via the plurality of apertures;
   d. a lower pulley attached to and projecting past the bottom end of the vertical support member;
   e. an adjustable frame movably attached to the base frame in between the upper pulley and the lower pulley;
   f. a means for adjusting the adjustable frame relative to the base frame;
   g. a support plate attached to the adjustable frame; and
   h. a means for adjustably securing the support plate to a can.

2. The adjustable wire puller of claim 1 further comprising a second upper pulley opposite the first upper pulley mounted on a second upper pulley mount, wherein the second upper pulley is rotatable about a second horizontal axis, and wherein the second horizontal axis is parallel to the first horizontal axis and on the opposite side of the central plane relative to the first horizontal axis.

3. The adjustable wire puller of claim 1, wherein the support plate comprises a handle.

4. The adjustable wire puller of claim 1, wherein the upper pulley mount is adjustably attached to the base frame.

5. An adjustable wire puller for removing wires from an underground conduit, comprising:
   a. a base frame having a pair of vertical support members, each vertical support member having a top end and a bottom end;
   b. a plurality of upper pulleys attached to the base frame, wherein the upper pulleys are attached on opposite sides of the base frame via mounting bars, the mounting bars comprising a means for adjusting the upper pulleys relative to the base frame;
   c. a lower pulley attached to and projecting beyond the bottom end of the vertical support member; and
   d. a pair of adjustable frames movably attached to the base frame in between the upper pulley and the lower pulley, each adjustable frame comprising a support plate.

6. The adjustable wire puller of claim 5, further comprising a means for adjusting the mounting bars.

7. The adjustable wire puller of claim 5, wherein each vertical support member comprises a means for adjusting the pair of adjustable frames to secure the pair of adjustable frames to the pair of vertical supports.

8. The adjustable wire puller of claim 5, wherein each support plate comprises a means for adjustably securing the support plates to a can.

9. An adjustable wire puller for removing wires from an underground conduit, comprising:
   a. a base frame having a vertical support member having a top end and a bottom end;
   b. a first upper pulley attached to the base frame;
   c. a lower pulley attached to and projecting past the bottom end of the vertical support member;
   d. an adjustable frame movably attached to the base frame in between the upper pulley and the lower pulley; and
   e. a stabilizing bar attachable to the support plate, the stabilizing bar having a substantially U-shaped configuration when viewed in cross-section with an open top end and a closed bottom end opposite the open top end, the open top end comprising a pair of lips.

10. The adjustable wire puller of claim 9 further comprising a means for adjusting a position of the first upper pulley.

11. The adjustable wire puller of claim 10 further comprising an upper pulley mount for receiving the first upper pulley.

12. The adjustable wire puller of claim 11, wherein the upper pulley mount is adjustable relative to the base frame.

13. The adjustable wire puller of claim 9 further comprising a second upper pulley opposite the first upper pulley.

14. The adjustable wire puller of claim 9 further comprising a support plate attached to the adjustable frame.

15. The adjustable wire puller of claim 14, wherein the support plate comprises a handle.

16. The adjustable wire puller of claim 14 further comprising a means for adjusting the adjustable frame relative to the base frame.

17. The adjustable wire puller of claim 14 further comprising a means for adjustably securing the support plate to a can.

18. The adjustable wire puller of claim 9 further comprising a spring-loaded nut to fasten the stabilizing bar to the support plate, the spring-loaded nut biasing against the pair of lips of the stabilizing bar to facilitate securement.

* * * * *